(12) United States Patent
Lin

(10) Patent No.: US 8,150,322 B2
(45) Date of Patent: Apr. 3, 2012

(54) SLAVE DEVICE COMPLYING WITH BLUETOOTH COMMUNICATION PROTOCOL AND RELATED METHOD FOR ESTABLISHING BLUETOOTH COMMUNICATION CONNECTION

(75) Inventor: Ying-Yao Lin, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 482 days.

(21) Appl. No.: 12/391,483

(22) Filed: Feb. 24, 2009

(65) Prior Publication Data

US 2010/0120363 A1    May 13, 2010

(30) Foreign Application Priority Data

Nov. 10, 2008   (TW) ............................... 97143429 A

(51) Int. Cl.
*H04B 7/00*    (2006.01)
(52) U.S. Cl. ....................... 455/41.2; 455/574
(58) Field of Classification Search ................ 455/41.2, 455/574
See application file for complete search history.

(56) References Cited

U.S. PATENT DOCUMENTS

| 7,167,722 | B2* | 1/2007 | Chiu et al. ................. 455/553.1 |
| 2006/0125789 | A1* | 6/2006 | Tu et al. ........................ 345/158 |
| 2007/0135178 | A1* | 6/2007 | Albulet et al. ................ 455/574 |
| 2007/0200684 | A1* | 8/2007 | Colby ........................ 340/10.51 |
| 2007/0262243 | A1* | 11/2007 | cheah et al. ................ 250/214 R |
| 2007/0287381 | A1* | 12/2007 | Hulvey ........................ 455/41.2 |

* cited by examiner

*Primary Examiner* — Joseph Chang
(74) *Attorney, Agent, or Firm* — Chun-Ming Shih

(57) ABSTRACT

A slave device that complies with Bluetooth communication protocol includes a communication module, a memory and a RF output module. The communication module can be operated to generate a driving signal. The memory stores an access code that complies with Bluetooth communication protocol and is electrically connected to the communication module. The memory is configured to determine whether or not to output the access code according to the driving signal output by the communication module. The RF output module is electrically connected to the memory so as to receive and output the access code.

8 Claims, 1 Drawing Sheet

SLAVE DEVICE COMPLYING WITH BLUETOOTH COMMUNICATION PROTOCOL AND RELATED METHOD FOR ESTABLISHING BLUETOOTH COMMUNICATION CONNECTION

CROSS-REFERENCE TO RELATED APPLICATIONS

This application is based upon and claims the benefit of priority from the prior Taiwanese Patent Application No. 097143429, filed Nov. 10, 2008, the entire contents of which are incorporated herein by reference.

BACKGROUND

1. Field of the Invention

This present invention relates to a device that complies with Bluetooth communication protocol, and more specifically to a slave device complying Bluetooth communication protocol with a simple architecture and to the related method for establishing a Bluetooth communication connection.

2. Description of Related Art

With the rapid development of electronic technology, wireless connection technology has been more and more widely used in people's lives and work. For example, a computer is connected with a mouse with wireless connection technology so that the mouse can be an input device for the computer and used to operate the computer. Currently Bluetooth technology is a wireless connection technology that is advancing quickly and being widely used.

Normally a method for establishing a Bluetooth communication connection between Bluetooth devices is the following. A Bluetooth device (hereafter referred to as the first Bluetooth device) transmits an inquiry signal and at the same time performs inquiry scanning so as to determine if there is another Bluetooth device (hereafter referred to as the second Bluetooth device) nearby. When the first Bluetooth device discovers the second Bluetooth device (and in the meanwhile the second Bluetooth device discovers the first Bluetooth device), the two Bluetooth devices determine which one (for example, the second Bluetooth device) functions as a master device and establish a Bluetooth communication connection. The other Bluetooth devices functions as a slave device. Next the second Bluetooth device, as the master device, transmits a paging signal and asks the first Bluetooth device (the slave device) whether the first Bluetooth device needs to establish a Bluetooth communication connection. Now, the first Bluetooth device as the slave device performs paging scanning and transmits a paging response to answer whether to establish a Bluetooth communication connection. Last, the second Bluetooth device as the master device establishes a Bluetooth communication connection with the first Bluetooth device according to the paging response signal transmitted from the first Bluetooth device as the slave device, and receives the signals from the first Bluetooth device (the slave device) by the established Bluetooth communication connection.

Hence, current Bluetooth devices normally have inquiry function, and can be determined to be a master device or a slave device according to the inquiry signal. In other words, current Bluetooth devices must be capable of operating as a master device and as a slave device at the same time.

However, some Bluetooth devices, such as a mouse as an input device for a computer, which only needs to transmit a signal to the computer to change the position of a cursor, do not need to refer to or know the status or information of other Bluetooth devices. In other words, although such Bluetooth devices are never required to operate as master devices, limited by the circuit architectures of the Bluetooth communication chips and the above-mentioned Bluetooth communication connection establishing method, these Bluetooth devices still need to be equipped with the functionalities of both master devices and slave devices so as to establish a Bluetooth communication connection. Hence, it is a waste of hardware resources to use current circuit architectures of the Bluetooth communication chips and current Bluetooth communication connection establishing method on devices that do not need to have the functionalities of Bluetooth master devices. In addition, because of the complexity of the circuit design and the corresponding software design, the cost required is relatively high.

BRIEF SUMMARY

An object of the present invention is to provide a slave device complying Bluetooth communication protocol with a simple architecture.

Another object of the present invention is to provide a special method for establishing a communication connection that complies with Bluetooth communication protocol.

A preferred embodiment of the present invention provides a slave device that complies with Bluetooth communication protocol including a communication module, configured for being operated to generate a driving signal; a memory, configured for storing an access code that complies with Bluetooth communication protocol, being electrically connected to the communication module, and determining whether or not to output the access code according to the driving signal output by the communication module; and a RF output module electrically connected to the memory and configured for receiving and outputting the access code.

In another preferred embodiment of the present invention, the slave device that complies with Bluetooth communication protocol is a mouse.

In yet another embodiment of the present invention, the slave device that complies with Bluetooth communication protocol further includes a sensor. The sensor is configured for sensing the motion of the slave device and transmitting a sensing signal to the communication module correspondingly so that the communication signal generates the driving signal.

In still another embodiment of the present invention, a method for establishing a communication connection that complies with Bluetooth communication protocol is provided. The method is for establishing a communication connection between a master device and a slave device, both of which comply with Bluetooth communication protocol. According to the method, a slave device that complies with Bluetooth communication protocol is configured to transmit an access code that complies with Bluetooth communication protocol. When the access code that complies with Bluetooth communication protocol is received by the master device that complies with Bluetooth communication protocol, the master device that complies with Bluetooth communication protocol is configured to determine whether or not to establish a communication connection with the slave device that complies with Bluetooth communication protocol.

In still another embodiment of the present invention, when receiving the access code that complies with Bluetooth communication protocol, the master device that complies with Bluetooth communication protocol is configured to transmit a paging signal asking the slave device that complies with Bluetooth communication protocol whether or not a communication connection between them needs to be established.

After transmitting the access code that complies with Bluetooth communication protocol, the slave device that complies with Bluetooth communication protocol is configured to perform paging scanning and to transmit a paging response signal after it receives the paging signal to answer whether it needs to establish a communication connection. When the slave device that complies with Bluetooth communication protocol expresses its demand to establish a communication connection by the paging response signal, the master device that complies with Bluetooth communication protocol can thus selectively establishes a communication connection with the slave device that complies with Bluetooth communication protocol.

The Bluetooth slave device provided by the preferred embodiments of the present invention does not need to have the function of paging inquiry, and hence in its circuit design not all the related circuits corresponding to the functionalities of a master device that complies with Bluetooth communication protocol needs to be covered so that the cost of circuit construction is saved. Correspondingly because such a slave device does not have the functionality of a master device, the conventional method for establishing a communication connection that complies with Bluetooth communication protocol can not be used. By the method for establishing a communication connection that complies with Bluetooth communication protocol provided by the present invention, the slave device that complies with Bluetooth communication protocol only needs to transmit an access code that complies with Bluetooth communication protocol so as to wake up the master device that complies with Bluetooth communication protocol, after which a communication connection between the master device and the slave device can be simply established. Hence, this method for establishing a communication connection that complies with Bluetooth communication protocol is relatively simple compared to the conventional method.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
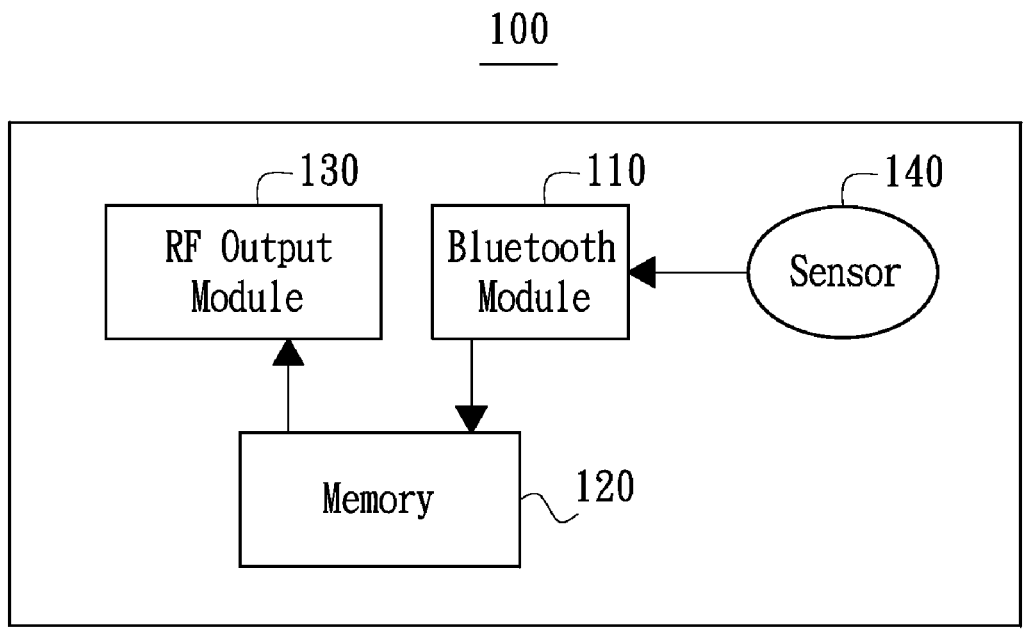
FIG. 1 is a circuit block diagram of a Bluetooth slave device in accordance with an embodiment of the present invention.

Referring to FIG. 1, a slave communication device in accordance with an embodiment of the present invention is provided. The communication protocol used by the slave communication device supports Bluetooth communication protocol. In other words, the slave communication device can be regarded as a slave device that complies with Bluetooth communication protocol, or a Bluetooth slave device. Hereafter, the slave communication device in this embodiment is referred to as the Bluetooth slave device 100. The Bluetooth slave device can be a mouse, some other computer peripheral device, or a portable device. The corresponding master Bluetooth device, which is connected with the Bluetooth slave device, can be a computer, a multi-media main frame or some other device that is capable of processing multiple types of information and performing multiple applications. In this embodiment, the Bluetooth slave device 100 mainly includes a Bluetooth module 110, a memory 120 and a RF (Radio Frequency) output module 130. The Bluetooth 110 is a communication module that complies with Bluetooth communication protocol.

The Bluetooth module 110 is electrically connected to the memory 120. The memory 120 stores a Bluetooth access code. In a special operation, the Bluetooth module 110 transmits a driving signal to the memory 120 so that the memory 120 in turn outputs the Bluetooth access code it stores.

In this embodiment, the Bluetooth slave device 100 can be a mouse. Preferably, the Bluetooth slave device 100 further includes a sensor 140 for detecting if the Bluetooth slave device 100 is in motion and the trace of its motion and generating a sensing signal corresponding to the result of the detection. The sensor 140 is electrically connected with the Bluetooth module 110. Here the operation that the Bluetooth slave device 100 is being moved can be defined as a special operation as previously mentioned. In other words, when the sensor 140 senses the mouse is moving and transmits the corresponding sensing signal to the Bluetooth module 110, the Bluetooth module 110 generates a driving signal and transmits the driving signal to the memory 120 so that the memory 120 outputs the Bluetooth access code it stores.

The memory 120 is electrically connected with the RF output module 130 so that the Bluetooth access code can be transmitted out. In this embodiment, the RF output module 130 includes an antenna for transmitting the Bluetooth access code. The Bluetooth access code in this embodiment is a RF signal in the frequency range of 2402 MHz to 2480 MHz.

Figure 2:
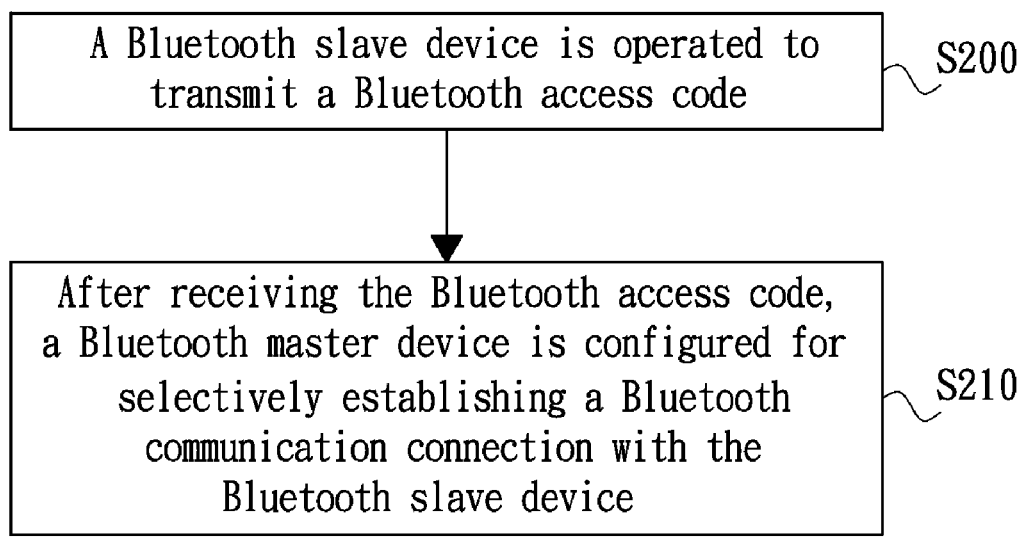
FIG. 2 is a process flow diagram of a method for establishing a Bluetooth communication connection in accordance with another embodiment of the present invention.

Referring to FIG. 2, a method for establishing a Bluetooth communication connection in accordance with another embodiment of the present invention is provided. In this embodiment, before establishing a valid Bluetooth communication connection, the Bluetooth slave device 100 as mentioned in the previous embodiment is operated to transmit a Bluetooth access code (Step S200). It should be noted that this Bluetooth access code may use the current common standard format and may also use a customized predefined format. It is important that both devices which use the access code understand what the code represents so that they can smoothly proceed with the corresponding responses and operations.

When the Bluetooth access code is transmitted by the slave Bluetooth device and received by a Bluetooth device with the functionality of a Bluetooth master device (referred to as Bluetooth master device hereafter), the Bluetooth master device is configured for selectively deciding whether or not to establish a Bluetooth communication connection with the Bluetooth slave device (S210). To be put in a simple way, after receiving the Bluetooth access code, the Bluetooth master device transmits a paging signal inquiring whether there is any Bluetooth slave device needs to establish a Bluetooth communication connection with it. In the meanwhile, the Bluetooth slave device, which transmitted the Bluetooth access code before, starts paging scanning after transmitting the Bluetooth access code, and transmits a paging response signal after it receives a paging signal to answer whether it needs to establish a Bluetooth communication connection. On the Bluetooth master device, the Bluetooth slave device that transmits the paging response signal can be displayed so that a user can choose whether or not to establish the Bluetooth communication connection.

In a further embodiment, the Bluetooth slave device can be a mouse device. Before a Bluetooth communication connection is established, the mouse device transmits the Bluetooth access code when it is moved. The Bluetooth master device can be a computer. The computer receives the Bluetooth access code the mouse transmits and establishes a Bluetooth communication connection as mentioned above.

More specifically, Bluetooth master devices, such as the computers, have the function of inquiry scanning. To save power, the computer can be configured to detect whether there is a wireless signal in the Bluetooth frequency range of RF spectrum when performing inquiry scanning. If there is a wireless signal, the Bluetooth master device continues inquiry scanning and determines whether the wireless signal is the Bluetooth access code transmitted by the Bluetooth slave device. If there is not any wireless signal, the Bluetooth master device stops scanning to save power. As known to an ordinary person in the art, Bluetooth signals are in the RF frequency range between 2402 MHz and 2480 MHz.

In summary, the Bluetooth slave device provided by the present invention does not need to have the functionalities of the Bluetooth master devices and thus the circuit design of the Bluetooth slave device is relatively simple. The method for establishing a Bluetooth communication connection provided by the present invention enables a Bluetooth device that only has the functionalities of a Bluetooth slave device to find a Bluetooth master device to establish a communication connection with on its own, and to establish a Bluetooth communication connection with the Bluetooth master device normally. Because in this process of establishing a Bluetooth communication connection, the inquiry scanning used in the related art was eliminated, the method for establishing a Bluetooth communication connection provided by the present invention is relatively simple.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A slave device that complies with Bluetooth communication protocol, comprising:
    a communication module, configured for generating a driving signal when the slave device that complies with Bluetooth communication protocol is being operated;
    a memory, configured for storing an access code that complies with Bluetooth communication protocol, being electrically connected to the communication module, and determining whether or not to output the access code according to the driving signal output by the communication module; and
    a RF output module electrically connected to the memory and configured for receiving and outputting the access code;
    wherein the slave device is configured to transmit the access code that complies with Bluetooth communication protocol before establishing a communication connection, and is not able to proceed inquiry scanning of Bluetooth communication protocol.

2. The slave device that complies with Bluetooth communication protocol of claim 1, wherein the slave device is a mouse.

3. The slave device that complies with Bluetooth communication protocol of claim 1 further comprises a sensor, the sensor being configured for sensing the motion of the slave device and transmitting a sensing signal to the communication module correspondingly so that the communication signal generates the driving signal.

4. The slave device that complies with Bluetooth communication protocol of claim 3, wherein the communication module is a Bluetooth module.

5. A method for establishing a communication connection that complies with Bluetooth communication protocol, comprising:
    before establishing a communication connection that complies with Bluetooth communication protocol, configuring a slave device that complies with Bluetooth communication protocol to transmit an access code that complies with Bluetooth communication protocol such that the slave device is not able to proceed inquiry scanning of Bluetooth communication protocol; and
    when the access code that complies with Bluetooth communication protocol is received by a device that complies with Bluetooth communication protocol and has the functionality of a master device that complies with Bluetooth communication protocol, configuring the device that complies with Bluetooth communication protocol to transmit a paging signal so as to establish a communication connection that complies with Bluetooth communication protocol with the slave device that complies with Bluetooth communication protocol.

6. The method for establishing a communication connection that complies with Bluetooth communication protocol of claim 5, further comprising:
    after the slave device that complies with Bluetooth communication protocol transmitting the access code that complies with Bluetooth communication protocol, configuring the slave device that complies with Bluetooth communication protocol to perform paging scanning; and
    when the slave device that complies with Bluetooth communication protocol receives the paging signal by paging scanning, configuring the slave device that complies with Bluetooth communication protocol to transmit a paging response signal so that the device that complies with Bluetooth communication protocol detects the existence of the slave device that complies with Bluetooth communication protocol.

7. The method for establishing a communication connection that complies with Bluetooth communication protocol of claim 6, further comprising:
    after the device that complies with Bluetooth communication protocol detects the existence of the slave device that complies with Bluetooth communication protocol, configuring the device that complies with Bluetooth communication protocol to display the related information so that a user can choose whether or not to establish a communication connection that complies with Bluetooth communication protocol with the slave device that complies with Bluetooth communication protocol.

8. The method for establishing a communication connection that complies with Bluetooth communication protocol of claim 5, further comprising:
    configuring the device that complies with Bluetooth communication protocol to detect whether there is a wireless signal in the RF spectrum containing signals complying with Bluetooth communication protocol when performing inquiry scanning;
    if there is a wireless signal, configuring the device that complies with Bluetooth communication protocol to continue inquiry scanning and determine whether the wireless signal is the access code that complies with Bluetooth communication protocol;
    if there is not any wireless signal, configuring the device that complies with Bluetooth communication protocol to stop inquiry scanning.

* * * * *